United States Patent
Chang

(10) Patent No.: US 12,105,914 B2
(45) Date of Patent: Oct. 1, 2024

(54) TOUCH DISPLAY DEVICE

(71) Applicant: Qisda Corporation, Taoyuan (TW)

(72) Inventor: Chih-Ming Chang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 50 days.

(21) Appl. No.: 17/830,438

(22) Filed: Jun. 2, 2022

(65) Prior Publication Data

US 2023/0297189 A1 Sep. 21, 2023

(30) Foreign Application Priority Data

Mar. 16, 2022 (CN) .......................... 202210259876.2

(51) Int. Cl.
*G06F 3/042* (2006.01)
*G06F 3/041* (2006.01)

(52) U.S. Cl.
CPC ........ *G06F 3/04184* (2019.05); *G06F 3/0412* (2013.01); *G06F 3/0416* (2013.01); *G06F 3/042* (2013.01)

(58) Field of Classification Search
CPC .. G02F 1/1336; G06F 3/04184; G06F 3/0412; G06F 3/0416; G06F 3/042
See application file for complete search history.

(56) References Cited

U.S. PATENT DOCUMENTS

| | | | |
|---|---|---|---|
| 6,262,696 B1 * | 7/2001 | Seraphim | G02F 1/1333 345/1.3 |
| 2015/0234540 A1 * | 8/2015 | Sasaki | G02B 27/026 345/175 |
| 2021/0318777 A1 * | 10/2021 | Mao | G06F 3/0416 |

* cited by examiner

*Primary Examiner* — Julie Anne Watko

(57) ABSTRACT

A touch detection method includes the following steps: (1). providing a touch display device, wherein the touch display device includes a plurality of LED units and a plurality of switches, each LED unit includes a LED and a photo sensor, and the switches are electrically coupled to the LED units; and (2). enabling the LED and a photo sensor coupled to the conductive one non-simultaneously during a conductive period of a conductive one of the switches. As a result, an influence of a touch detection of the photo sensor by a light emission of the LED could be reduced.

10 Claims, 6 Drawing Sheets

TOUCH DISPLAY DEVICE

This application claims the benefit of People's Republic of China application Serial No. 202210259876.2, filed on Mar. 16, 2022, the subject matter of which is incorporated herein by reference.

TECHNICAL FIELD

The disclosure relates in general to a touch display device.

BACKGROUND

With the advent of the fifth-generation (5G) mobile communication and ultra-high-quality display (for example, 8K) era, a conference system includes an ultra-large screen combined with the Mini/Micro Light-Emitting Diode (LED) display technology is expected to develop into a new Blue Ocean Market. The ultra-large screen integrates wireless transmission, video conference, interactive writing and other functions, and could be applied to large and medium-sized conference rooms, lecture halls, multi-function halls, multimedia rooms, exhibitions, remote education, home theaters, classrooms and other large scenes, and thus it could greatly improve efficiency of meeting collaboration. With the demand of high-quality display for 5G transmission and consumption upgrades, LED commercial display has huge development potential. However, it is generally difficult to design a touch control structure for such large screen. Therefore, providing a device with both display and touch functions is one of the goals of those skilled in the art.

SUMMARY

According to an embodiment, a touch display device is provided. The touch display device includes a plurality of Light-Emitting Diode (LED) units and a plurality of switches. Each LED unit includes a LED and a photo sensor. The switches are electrically coupled to the LED units. During a conductive period of a conductive one of the switches, the LED and the photo sensor coupled to the conductive one are enabled non-simultaneously.

According to another embodiment, a touch detection method is provided. The touch detection method includes the steps: providing a touch display device, wherein the touch display device comprises a plurality of LED units and a plurality of switches, each LED unit comprises a LED and a photo sensor, and the switches are electrically coupled to the LED units; and enabling the LED and the photo sensor coupled to the conductive one non-simultaneously during a conductive period of a conductive one of the switches.

The above and other aspects of the disclosure will become better understood with regard to the following detailed description of the preferred but non-limiting embodiment (s). The following description is made with reference to the accompanying drawings.

Figure 1:
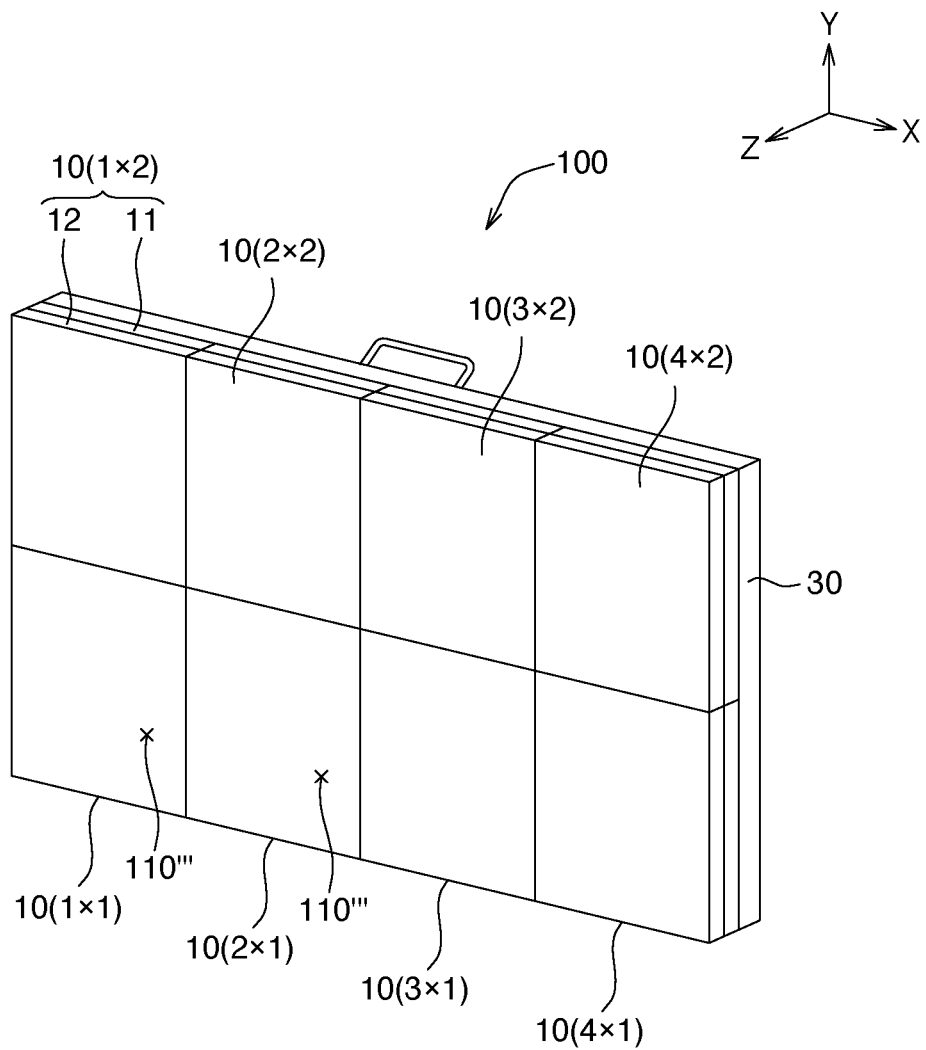
FIG. 1 shows a schematic diagram of a touch display device according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
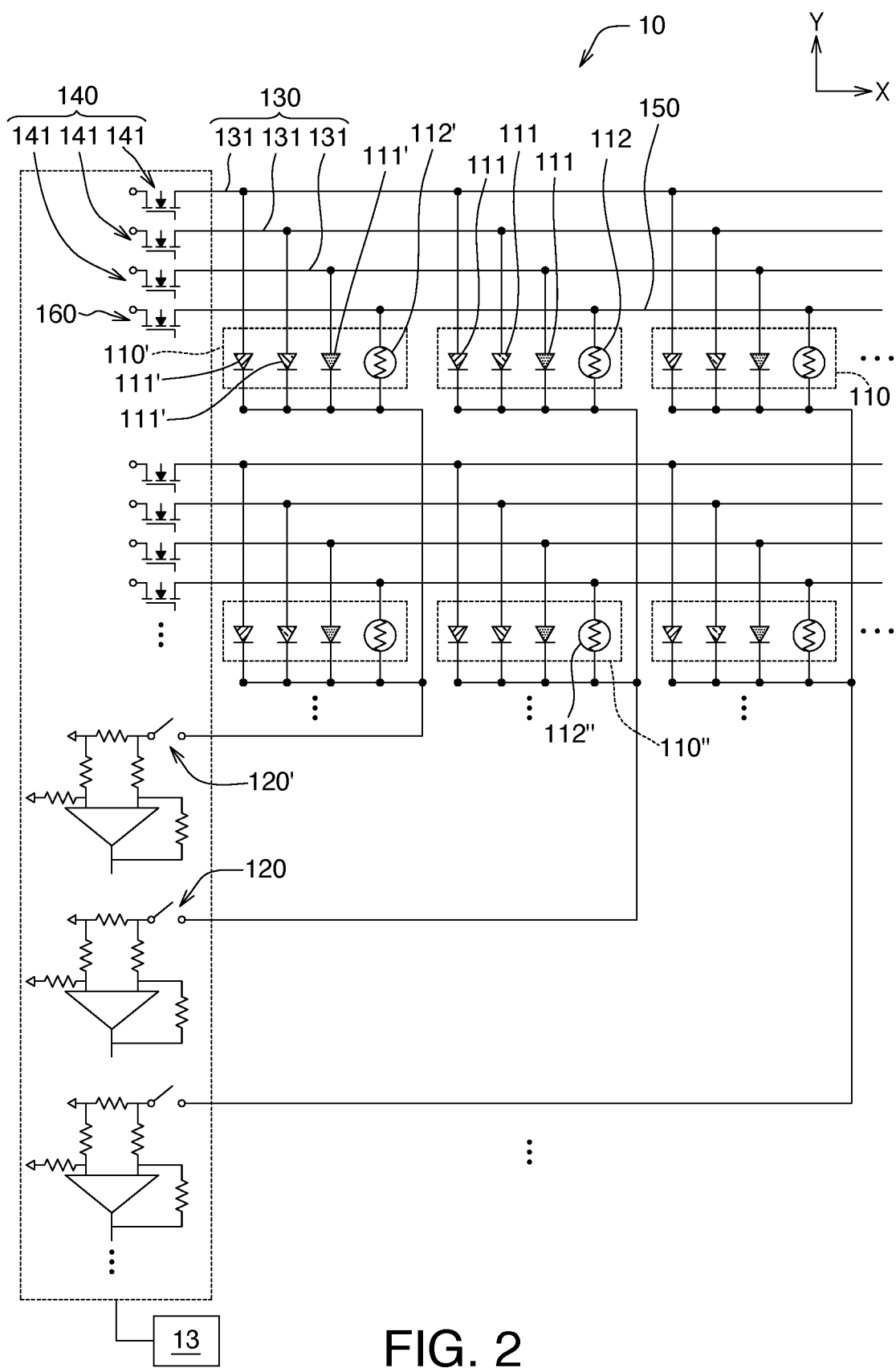
FIG. 2 shows a schematic circuit diagram of the touch display device of FIG. 1.
Figure 3:
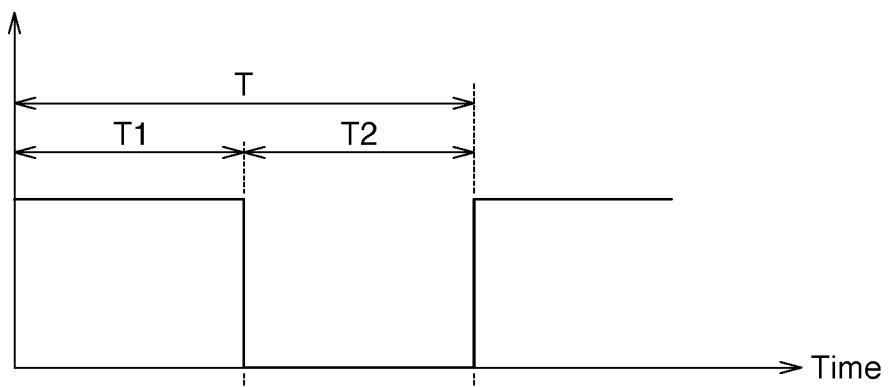
FIG. 3 shows a schematic diagram of a working timing of a LED and an photo sensor in the same LED unit of FIG. 2.
Figure 3:
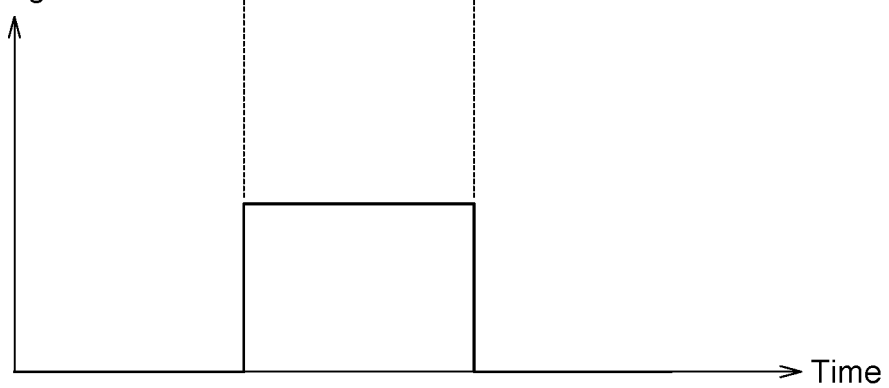
Figure 4:
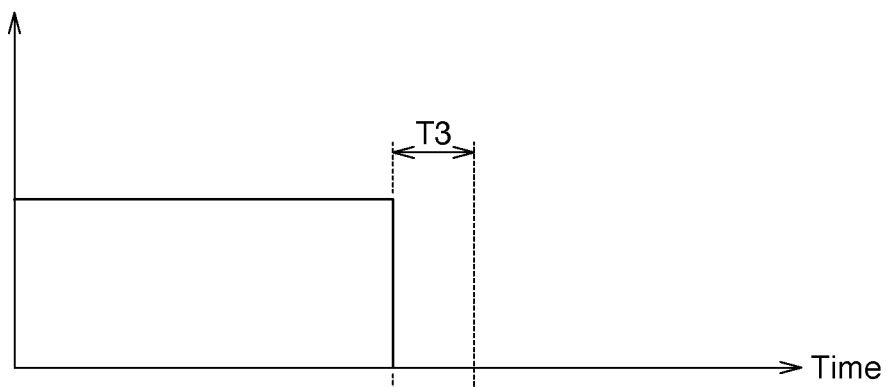
FIG. 4 shows a schematic diagram of a working timing of the LEDs and the photo sensors of a number of the LED units of FIG. 2.
Figure 4:
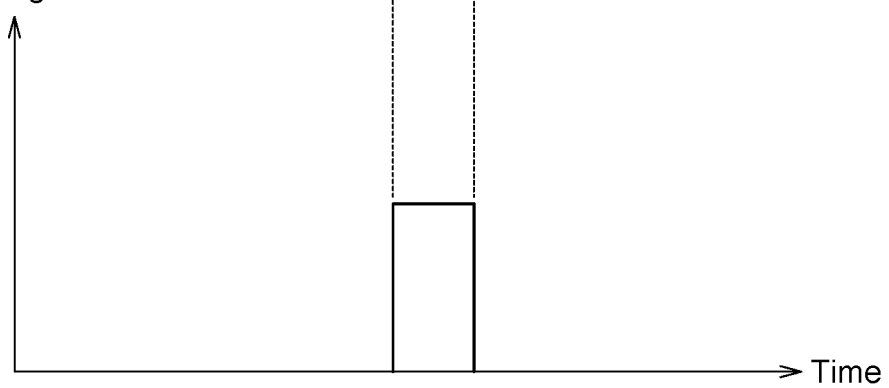
Figure 5:
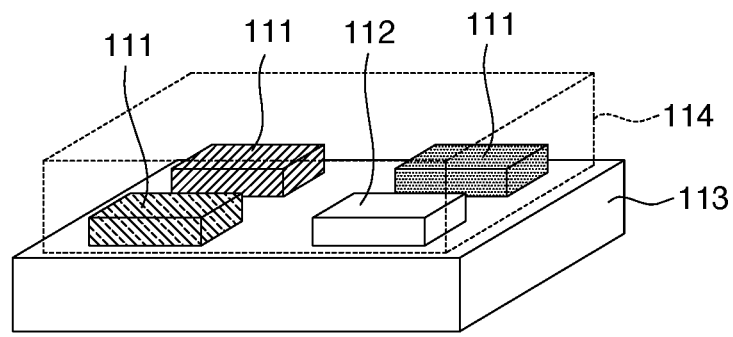
FIG. 5 shows a schematic diagram of the LED of FIG. 2.
Figure 6:
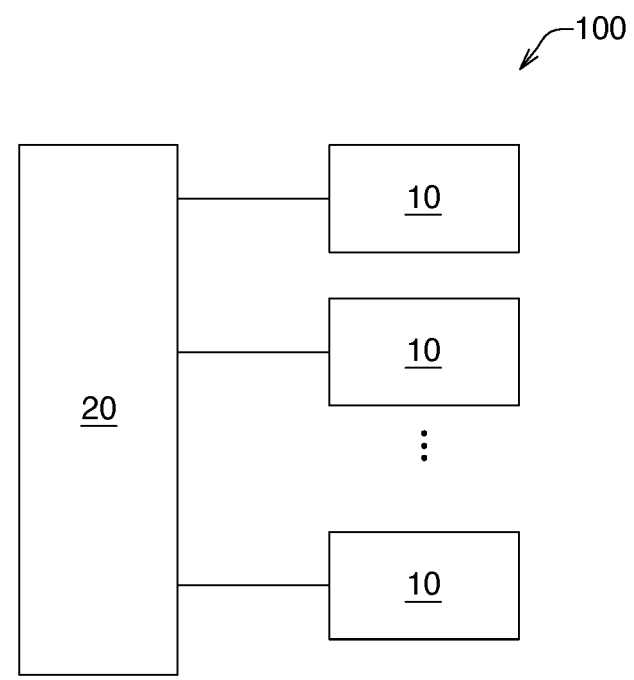
FIG. 6 shows a functional block of the touch display device of FIG. 1.

Referring to FIGS. 1 to 6, FIG. 1 shows a schematic diagram of a touch display device 100 according to an embodiment of the present invention, FIG. 2 shows a schematic circuit diagram of the touch display device 100 of FIG. 1, FIG. 3 shows a schematic diagram of a working timing of a LED 111 and an photo sensor 112 in the same LED unit 110 of FIG. 2, FIG. 4 shows a schematic diagram of a working timing of the LEDs 111 and the photo sensors 112 of a number of the LED units 110 of FIG. 2, FIG. 5 shows a schematic diagram of the LED 111 of FIG. 2, and FIG. 6 shows a functional block of the touch display device 100 of FIG. 1.

The touch display device 100 could be used, for example, as a light panel, a light box, a screen, a broadcast panel, etc.

As shown in FIGS. 1 and 2, the touch display device 100 includes a number of the LED units 110 and a number of switches 120. Each LED unit 110 includes at least one LED 111 and at least one photo sensor 112. The switches 120 are electrically coupled to the LED units 110. During a conductive period of a conductive one of the switches 120, the LED 111 and the photo sensor 112 which are coupled to the conductive one are enabled non-simultaneously. As a result, the influence of the touch detection of the photo sensor 112 by the light emission of the LED 111 could be reduced.

As shown in FIGS. 2 and 3, a control signal C1 in FIG. 3 represents a control timing for the LED 111, and a control signal C2 represents a control timing for the photo sensor 112. For the LED unit 110', when the switch 120' (conductive one) coupled to the LED unit 110' is turned on, during a first section T1 of the conductive period T, the LED 111' coupled to the switch 120' is turned on, but the photo sensor 112' coupled to the switch 120' is turned off. During a second section T2 of the conductive period T, the LED 111' coupled to the switch 120' is turned off, but the photo sensor 112' coupled to the switch 120' is turned on. As a result, the LED 111' and the photo sensor 112' coupled to the same LED unit 110' are enabled non-simultaneously, and thus the enabled photo sensor 112' is minimally interfered by the light or even is not interfered by light, thereby improving the accuracy of touch detection.

In an embodiment, when the photo sensor 112 of one of the LED units 110 is enabled, the LEDs 111 of at least one LED unit 110 surrounding (or adjacent to) the one of the LED units 110 are all disabled (not to emit light). As a result, the enabled photo sensor 112 is minimally interfered by the light or even is not interfered by light, thereby improving the accuracy of touch detection.

Furthermore, as shown in FIGS. 2 and 4, a control signal C4 of FIG. 4 represents a control timing of the photo sensor 112 of one of the LED units 110, and a control signal C3 represents a control timing of the LED 111 of another or the others of the LED units 110. Taking nine LED units arranged in a 3×3 array as an example, in an enabling section T3 for the photo sensor 112" of the LED unit 110", eight LEDs 111 of eight LED units 110 surrounding (or around, or adjacent to) the LED unit 110" are all disabled. As a result, the enabled photo sensor 112" is minimally interfered by the light from the LEDs 111' or even is not interfered by light, thereby improving the accuracy of touch detection.

As shown in FIG. 5, the LED unit 110 is, for example, a semiconductor package. The LED unit 110 includes the LEDs 111, a circuit board 113 and a package body 114 (in order to clearly express the LEDs 111, the package body 114 is drawn with dotted lines). The LED 111 is disposed on and electrically connected to the circuit board 113. The package body 114 is formed on the circuit board 113 and covers the LEDs 111. The LED 111 is, for example, Mini or Micro LED. In one LED unit 110, each LED 111 could emit light of different colors, such as red light, green light or blue light, but the embodiment of the present invention is not limited thereto. The embodiment of the present invention does not limit the number and/or arrangement of the LEDs 111 of the LED unit 110. In addition, the photo sensor 112 is, for example, a photoresistor or other sensors capable of detecting light.

As shown in FIG. 2, the touch display device 100 further includes a number of first scan line groups 130 and a number of first switch groups 140. Each first scan line group 130 extends in a first axis X, the first scan line groups 130 are arranged in a second axis Y, and each first scan line group 130 is electrically coupled to a number of the first scan line groups 130 arranged in the first axis X. The switches 120 are electrically coupled to the LED units 110 arranged in the second axis Y. Each first switch group 140 is electrically coupled to the corresponding first scan line group 130. The first switch groups 140 are turned on in sequence. When one of the first switch groups 140 is turned on, the others of the first switch groups 140 are turned off. As a result, during one conductive period T, only the LED 111 of one LED unit 110 that is turned on is enabled (working).

As shown in FIG. 2, each first scan line group 130 includes a number of first scan lines 131, and each first switch group 140 includes a number of first switches 141. Each first scan line 131 electrically couples the corresponding LED 111 and first switch 141, so that the first switch 141 could control the corresponding LED 111 through the first scan line 131.

The touch display device 100 further includes a number of second scan lines 150 and a number of second switches 160. Each second scan line 150 extends in the first axis X, the second scan lines 150 are arranged in the second axis Y, and each second scan line 150 is electrically coupled to a number of the photo sensors 112 arranged in the first axis X. The switches 120 are electrically coupled to the photo sensors 112 arranged in the second axis Y. Each second switch 160 is electrically coupled to the corresponding second scan line 150. The second switches 160 are turned on in sequence. When one of the second switches 160 is turned on, the others of the second switches 160 are turned off. As a result, in one conductive period T, only the photo sensor 112 of one LED unit 110 that is turned on is enabled (working).

As shown in FIGS. 1 and 6, the touch display device 100 includes A1×B1 LED modules 10, a control unit 20 and a circuit board 30, wherein A1×B1 LED modules 10 and the control unit 20 could be disposed on and electrically connected to the circuit board 30. A1 and B1 are positive integers greater than 1, and depending on the size of the touch display device 100, the embodiments of the present invention do not limit the values of A1 and B1. In the present embodiment, the value of A1 is, for example, 4 and the value of B1 is, for example, 2, but the value could be larger or smaller. Each LED module 10 includes a circuit board 11, a control unit 13 (the control unit 13 is shown in FIG. 2), M1×N1 LED units 110, a number of the switches 120, a number of the first scanning line groups 130, a number of the first switch groups 140, a number of the second scan lines 150 and a number of the second switches 160, wherein the M1×N1 LED units 110, the switches 120, the first scan line groups 130, the first switch groups 140, the second scan lines 150 and the second switches 160 are summarized by a reference numeral 12 in FIG. 1. The control unit 13 could output a control signal to control the first switch groups 140 and the second switches 160 to be turned on or off periodically.

As shown in FIGS. 1 and 6, in one LED module 10, the M1×N1 LED units 110, the switches 120, the first scan line groups 130, the first scan line groups 130, the switch group 140, the second scan lines 150 and the second switches 160 could be disposed on and electrically connected to the circuit board 11. The $(m1 \times n1)^{th}$ LED unit 110 has a first address [m1,n1], wherein M1 and N1 are positive integers greater than 1, m1 is positive integer ranging between 1 to M1, and n1 is positive integer ranging between 1 to N1. The values of M1 and N1 depend on the resolution and/or size of the LED module 10 or the resolution and/or size of the touch display device 100, and are not limited by the embodiment of the present invention. The control unit 20 is configured to, in response to a touch signal (for example, the photo sensor 112 of the $(m1 \times n1)^{th}$ LED unit 110 detects that the $(m1 \times n1)^{th}$ LED unit 110 is touched (or shielded)) of the $(m1 \times n1)^{th}$ LED unit 110 of the $(a1 \times b1)^{th}$ LED module, convert the first address [m1,n1] of the $(m1 \times n1)^{th}$ LED unit 110 into the second address $[((a1-1) \times M1+m1), ((b1-1) \times N1+n1)]$ (conversion formula), wherein a1 is positive integer ranging between 1 to A1, and b1 is positive integer ranging between 1 to B1. Although not shown, there is an address interface disposed between the LED module 10 and the control unit 20, and the control unit 20 could perform address conversion or detection through the address interface.

Furthermore, as shown in FIG. 1, the LED unit 110''' of the $(1 \times 1)^{th}$ LED module $10_{,1 \times 1}$ has the address [1, 1]. For the $(2 \times 1)^{th}$ LED module $10_{,2 \times 1}$, the LED units 110''' which is located at the same position (of two LED modules) has the same address [1, 1]. In order for each LED unit 110 of each LED module 10 to have a unique (or different) address in the touch display device 100, the control unit 20 could performs the address conversion for the LED unit 110 of the LED modules 10. Taking the $(2 \times 2)^{th}$ LED unit 110 of the $(1 \times 1)^{th}$ LED module $10_{,1 \times 1}$ as an example, the control unit 20 could convert the first address [2, 2] of the $(2 \times 2)^{th}$ LED unit 110 of the $(1 \times 1)^{th}$ LED module $10_{,1 \times 1}$ into the second address [2, 2] by using the aforementioned conversion formula. Taking the $(2 \times 2)^{th}$ LED unit 110 of the $(2 \times 1)^{th}$ LED module $10_{,2 \times 1}$ as an example, the control unit 20 could convert the first address [2, 2] of the $(2 \times 2)^{th}$ LED unit 110 of the $(2 \times 1)^{th}$ LED module $10_{,2 \times 1}$ into the second address [M1+2,2] by using the aforementioned conversion formula. As a result, each LED unit 110 of each LED module 10 of the touch display device 100 has a unique (or different) second address relative to the touch display device 100.

Figure 7:
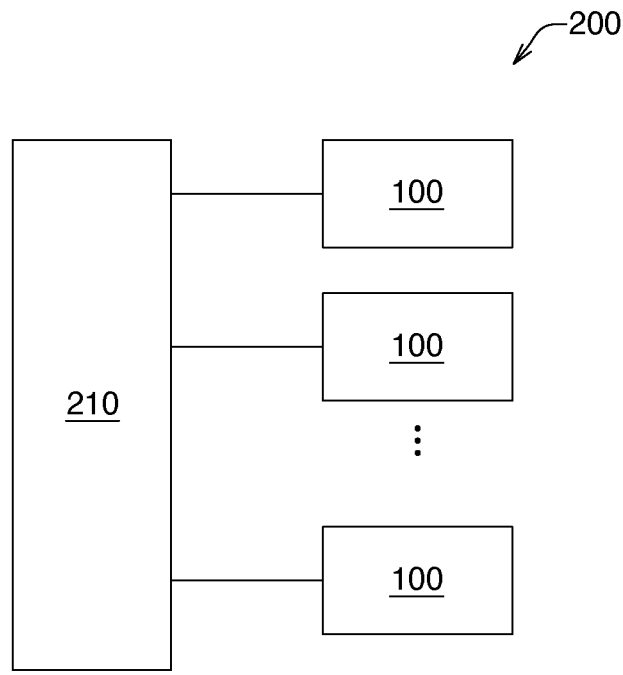
FIG. 7 shows a schematic diagram of a touch display device according to another embodiment of the present invention.

Referring to FIG. 7, FIG. 7 shows a schematic diagram of a touch display device 200 according to another embodiment of the present invention. The touch display device 200 includes a plurality of the touch display devices 100 which form a larger screen. Although not shown, a number of the touch display devices 100 could be arranged in a matrix of A2×B2, wherein A2 and B2 are positive integers greater than 1. Depending on the size of the touch display device 200, the embodiments of the present invention do not limit the values of A2 and B2, and the values could be positive integers ranging between 2 and 100, or even greater.

As shown in FIG. 7, the touch display device 200 further includes a control unit 210 electrically coupled to each touch display device 100. The control unit 210 could convert the addresses of the LED units 110 of each touch display device 100 of the touch display device 200 into unique or different addresses, so that each LED unit 110 has the unique address relative to the control display device 200. In addition, the address conversion method adapted by the control unit 210 is similar to that of the aforementioned touch display device 100, and the similarities will not be repeated here.

As described above, each LED module 10 is modularized so as to be easily disposed on the circuit board 30. A number of the LED modules 10 could form the touch display device 100. Furthermore, each touch display device 100 is modularized so as to be easily disposed on another circuit board. A number of the touch display devices 100 could form the touch display device 200 having a larger size. Based on such principle, a number of the touch display devices in the previous stage could form a touch display device having a larger size in the next stage. Due to the modularization, the touch display device of the embodiment of the present invention does not need a conventional cover glass, and could be assembled to form a curved screen and/or have no frame (frameless screen).

Figure 8:
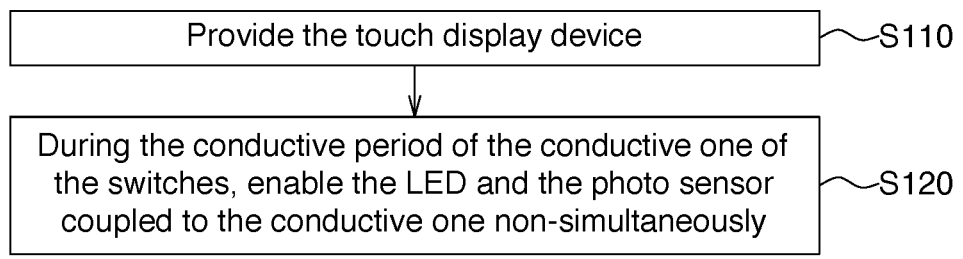
FIG. 8 shows a flowchart of a touch detection method according to an embodiment of the present invention.

Referring to FIG. 8, FIG. 8 shows a flowchart of a touch detection method according to an embodiment of the present invention.

In step S110, the touch display device 100 or 200 is provided.

In step S120, during the conductive period T of the conductive one of the switches 120, the control unit 13 could enable the LED 111 and the photo sensor 112 coupled to the conductive one non-simultaneously.

The other touch detection steps have been described above and they will not be repeated here.

To sum up, the embodiments of the present invention provide the touch display device. The touch display device includes a plurality of LED units, and each LED unit includes the LED and the photo sensor. In one conductive (turned-on) LED unit, the LED and the photo sensor are turned-on non-simultaneously, or are turned-on not at the same time, or the turn-on times are completely staggered.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A touch display device, comprising:
    a plurality of Light-Emitting Diode (LED) units each comprising:
        a LED; and
        a photo sensor; and
    a plurality of switches electrically coupled to the LED units;
    wherein during a conductive period of a conductive one of the switches, the LED and the photo sensor which are coupled to the conductive one are enabled non-simultaneously;
    wherein the touch display device further comprises:
        a plurality of scan line groups each extending in a first axis, wherein the scan line groups are arranged in a second axis;
        wherein each switch is electrically coupled to the LED units which are arranged in the second axis;
        wherein each scan line group is electrically coupled to the LED units which are arranged in the first axis;
    wherein the touch display device further comprises:
        a plurality of first switch groups electrically coupled to the scan line groups;
        wherein the first switch groups are turned on in sequence, and when one of the first switch groups is turned on, the others of the first switch groups are turned off.

2. The touch display device according to claim 1, further comprising:
    a plurality of scan lines each extending in the first axis, wherein the scan lines are arranged in the second axis, and each scan line is electrically coupled to a corresponding plurality of the photo sensors arranged in the first axis;
    wherein each switch is electrically coupled to the photo sensors arranged in the second axis.

3. The touch display device according to claim 2, further comprising:
    a plurality of second switches electrically coupled to the scan lines;
    wherein the second switches are turned on in sequence, and when one of a plurality of the first switch groups is turned on, the others of the first switch groups are turned off.

4. The touch display device of claim 1, wherein when the photo sensor of one of the LED units is enabled, the LEDs of the LED units surrounding the one of the LED units are disabled.

5. The touch display device according to claim 1, comprising:
    A1×B1 LED modules, wherein A1 and B1 are positive integers greater than 1, and each LED module comprises:
        a circuit board; and
        M1×N1 LED units are disposed on the circuit board, wherein the (m1×n1)$^{th}$ LED unit has a first address [m1,n1], wherein M1 and N1 are positive integers greater than 1, m1 is positive integer ranging between 1 to M1, and n1 is positive integer ranging between 1 to N1;
    wherein the touch display device further comprises a control unit, and the control unit is configured for:
        in response to a touch signal of the (m1×n1)$^{th}$ LED unit of the (a1×b1)$^{th}$ LED module, the first address [m1, n1] of the (m1×n1)$^{th}$ LED unit is converted into a second address [((a1−1)×M1+m1),((b1−1)×N1+ n1)], wherein a1 is positive integer ranging between 1 to A1, and b1 is positive integer ranging between 1 to B1.

6. The touch display device of claim 1, wherein each LED unit is a semiconductor package.

7. A touch detection method, comprising:
provinding a touch display device, wherein the touch display device comprises a plurality of LED units, a plurality of switches and a plurality of scan line groups, wherein each LED unit comprises a LED and a photo sensor, the switches are electrically coupled to the LED units, each scan line group extends in a first axis, the scan line groups are arranged in a second axis, and each switch is electrically coupled to the LED units which are arranged in the second axis; and
enabling the LED and the photo sensor which are coupled to a conductive one non-simultaneously during a conductive period of the conductive one of the switches;
wherein the touch display device further comprises: a plurality of scan lines each extending in the first axis, wherein the scan lines are arranged in the second axis, and each scan line is electrically coupled to a corresponding plurality of the photo sensors arranged in the first axis; wherein each switch is electrically coupled to the photo sensors arranged in the second axis; the touch display device further comprises a plurality of second switches electrically coupled to the scan lines, and the touch detection method further comprises:
turning on one of the second switches and turning off the others of the second switches.

8. The touch detection method according to claim 7, further comprising:
enabling the photo sensor of one of the LED units and disabling the LEDs of the LED units surrounding the one of the LED units.

9. The touch detection method according to claim 7, wherein the touch display device further comprises A1×B1 LED modules, A1 and B1 are positive integers greater than 1, each LED module comprises a circuit board and M1×N1 the LED units disposed on the circuit board, the $(m1 \times n1)^{th}$ LED unit has a first address [m1,n1], M1 and N1 are positive integers greater than 1, m1 is positive integer ranging between 1 to M1, and n1 is positive integer ranging between 1 to N1; the touch detection methods further comprises:
in response to a touch signal of the $(m1 \times n1)^{th}$ LED unit of the $(a1 \times b1)^{th}$ LED module, converting the first address [m1,n1] of the $(m1 \times n1)^{th}$ LED unit into a second address [((a1−1)×M1+m1),((b1−1)×N1+n1)], wherein a1 is positive integer ranging between 1 to A1, and b1 is positive integer ranging between 1 to B1.

10. A touch display device, comprising:
a plurality of LED units each comprising:
a LED; and
a photo sensor; and
a plurality of switches electrically coupled to the LED units;
wherein during a conductive period of a conductive one of the switches, the LED and the photo sensor which are coupled to the conductive one are enabled non-simultaneously;
wherein the touch display device further comprises:
a plurality of scan line groups each extending in a first axis, wherein the scan line groups are arranged in a second axis;
wherein each switch is electrically coupled to the LED units which are arranged in the second axis;
wherein the touch display device further comprises:
a plurality of scan lines each extending in the first axis, wherein the scan lines are arranged in the second axis, and each scan line is electrically coupled to a corresponding plurality of the photo sensors arranged in the first axis;
wherein each switch is electrically coupled to the photo sensors arranged in the second axis.

* * * * *